(12) United States Patent
Schmidt

(10) Patent No.: US 7,979,967 B2
(45) Date of Patent: Jul. 19, 2011

(54) METHOD FOR MANUFACTURING A HINGE, HINGE AND HINGE PIN

(76) Inventor: Heiko Schmidt, Lappersdorf (DE)

( * ) Notice: Subject to any disclaimer, the term of this patent is extended or adjusted under 35 U.S.C. 154(b) by 1114 days.

(21) Appl. No.: 11/797,092

(22) Filed: Apr. 30, 2007

(65) Prior Publication Data

US 2007/0277346 A1 Dec. 6, 2007

(30) Foreign Application Priority Data

| May 2, 2006 | (DE) | .......................... 10 2006 020 601 |
| Jul. 6, 2006 | (DE) | .......................... 10 2006 031 616 |
| Oct. 20, 2006 | (DE) | .......................... 10 2006 050 463 |

(51) Int. Cl.
  *B21D 53/40* (2006.01)
  *B23P 11/00* (2006.01)
  *B23P 19/02* (2006.01)
(52) U.S. Cl. ............................. 29/11; 29/525; 29/525.05
(58) Field of Classification Search .................... 16/226, 16/254, 257, 337, 380, 386; 29/11, 428, 29/432, 432.1, 505, 521, 525, 525.05, 525.06, 705, 718, 243.53, 512, 795, 796, 797
See application file for complete search history.

(56) References Cited

U.S. PATENT DOCUMENTS

| 5,529,812 A | * | 6/1996 | Keding ........................ 427/496 |
| 5,577,295 A | * | 11/1996 | Papke et al. ..................... 16/254 |
| 6,499,926 B2 | * | 12/2002 | Keener ........................... 411/504 |
| 7,657,987 B2 | * | 2/2010 | Babej ............................ 29/432.1 |
| 2004/0025295 A1 | * | 2/2004 | Becker et al. ................... 16/254 |
| 2005/0022359 A1 | * | 2/2005 | Muller et al. ................... 29/512 |

* cited by examiner

*Primary Examiner* — David P Bryant
*Assistant Examiner* — Alexander P Taousakis
(74) *Attorney, Agent, or Firm* — Welsh Flaxman & Gitler LLC

(57) ABSTRACT

The invention relates to a method for manufacturing a hinge between two workpieces or components; first a hinge socket is inserted in an opening of the first component and then a hinge pin is inserted in the hinge socket; the second component can be fastened to the hinge pin end protruding from the hinge socket.

36 Claims, 10 Drawing Sheets

US 7,979,967 B2

METHOD FOR MANUFACTURING A HINGE, HINGE AND HINGE PIN

BACKGROUND OF THE INVENTION

The invention relates to a method for manufacturing a hinge to a hinge connection or to a hinge pin.

Hinges between two components or workpieces are needed in a wide range of technical areas, for example in automobile construction in so-called linkages, e.g. between the vehicle body and a moveable body element, e.g. between the vehicle body and an engine hood or a trunk lid. Such hinges are also needed in other technical areas and generally consist of a hinge socket held torsionally stable in a component and of a hinge pin, which can rotate or pivot with a socket section in the hinge socket, is secured against axial displacement so that it bears with a pin head on the first component or on a flange-like section of the bearing or hinge socket and is fastened in the second component in a suitable manner, for example by riveting.

It is an object of the invention is to present a method for the simplified and especially effective manufacture of such hinges or hinge connections.

SUMMARY OF THE INVENTION

According to one aspect of the invention, at least the respective socket is inserted in the one component of the hinge or of the hinge connection in or under a press or in a tool provided there, for example a follow-on tool, which then is also used for example for the manufacture of the component. The press or the tool there is also used to insert the respective hinge pin and, if applicable, to connect the hinge pin with the further component forming the hinge connection.

According to another aspect of the invention the respective hinge pin, after being inserted into the hinge socket, is secured on the latter or on the one component against falling out or getting lost, in a manner that the rotary movement of the hinge pin in the hinge socket is not hindered thereby. Securing of the hinge pin is achieved by plastic deformation or clinching of at least one area of the respective hinge pin, for example so as to form a section that protrudes radially over the circumference of the hinge pin and thus securing the latter against falling out of the hinge socket. Securing of the respective hinge pin is possible both in a method in which the insertion of the hinge socket is carried out in or under the press and also at processing stations outside of the press.

According to a further aspect of the invention the insertion and/or calibration and/or at least partial fastening of the respective hinge socket takes place by bending a socket edge, not by a path-controlled movement of the tools used for this process, but rather in a power-controlled manner or using at least one floating and/or spring-mounted tool, i.e. by no means path-controlled, in order to prevent damage and/or deformation of the hinge sockets. This method takes into account that hinge sockets are components that are relatively easily deformable and accordingly prevents inadvertent deformation and/or damage to said hinge sockets. The use of at least one floating and/or spring mounted tool for the calibration and/or at least temporary fastening of the hinge sockets has advantages especially when the method is executed under or in a press, but is also suitable for methods executed outside of a press.

"Press" according to the invention generally refers to a mechanism, with which components or workpieces are normally manufactured from a flat or sheet material, generally metal, e.g. sheet steel, by means of punching and/or forming and which comprises two tool heads for this purpose, at least one of which is moved by the press drive relative to the other tool head in a path-controlled manner for closing and opening the press or the production tool used in the press, for example a follow-on tool or stage tool.

"Follow-on tool" according to the invention refers to the tool used in a press for manufacturing the respective component or workpiece and/or for inserting components in the component or workpiece in several processing steps and at several processing positions, and the components are connected with each other via material sections and moved through the tool or the processing stations step by step.

"Stage tool" or "Step tool" according to the invention refers to a tool used in a press in which the manufacture of the respective component or workpiece and/or the insertion of components in the component or workpiece likewise takes place in several processing steps or stages, however the individual components or workpieces are not connected with each other via material sections but are moved by a conveyor system, formed for example by transfer beams, through the tool or the individual processing positions.

BRIEF DESCRIPTION OF THE DRAWING

The invention is described in more detail below based on exemplary embodiments with reference to the drawings, in which.

DETAILED DESCRIPTION OF THE INVENTION

Figure 1:
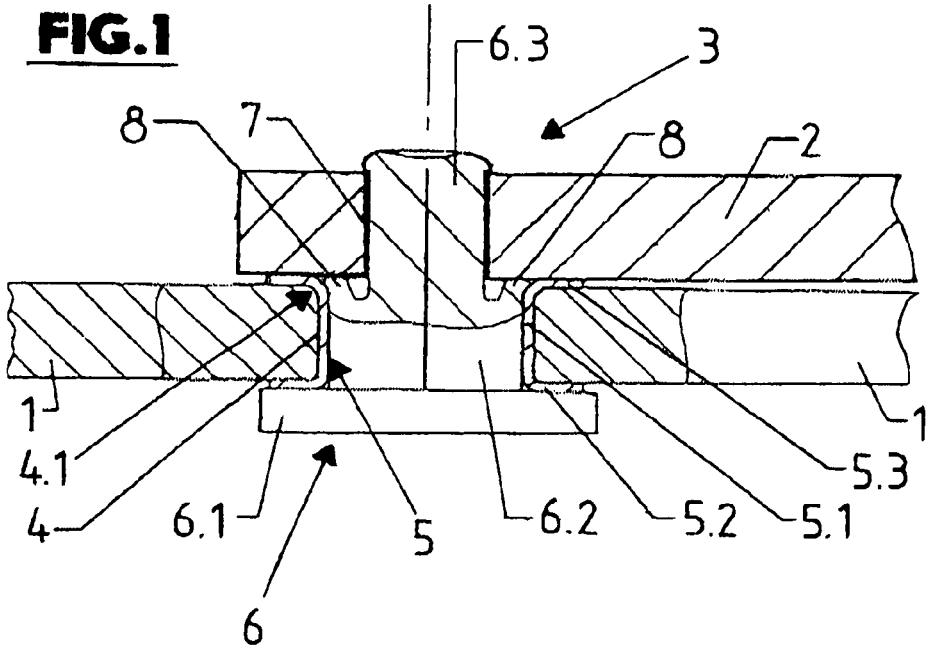
FIG. 1 shows a simplified representation of a hinge formed between two components, consisting essentially of a hinge socket and a hinge pin.
Figure 2:
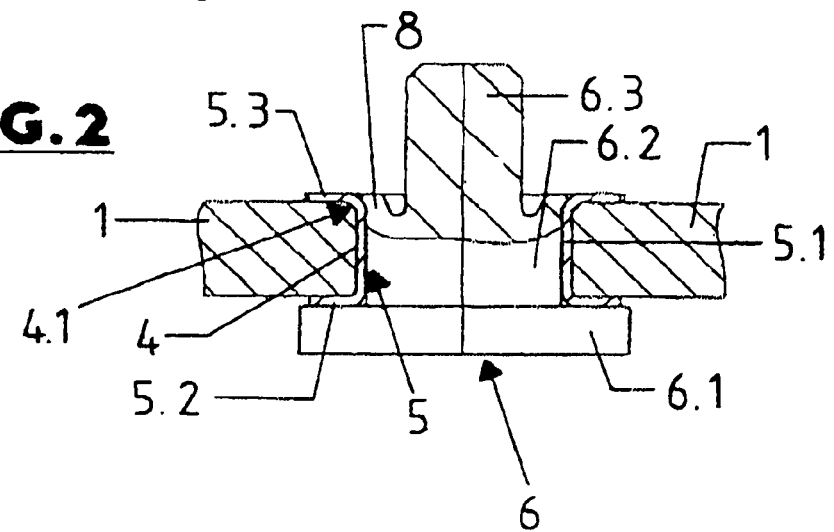
FIG. 2 shows a simplified representation of the intermediate product obtained after joining of the hinge socket and the bearing pin.

In FIG. 1, 1 and 2 are two workpieces or components made of metal, for example made of sheet steel by punching and bending, which are connected with each other by means of a hinge 3 and of which the component 1 is manufactured for example by being stamped from a metal flat material, for example sheet steel, in a follow-on or stage tool located in a press. The component 2 is for example an element of a rod, which is hinged to the component 1 by means of the hinge.

The hinge 3 consists of a bearing or hinge socket 5 inserted into an opening 4 of the component 1 and is manufactured from a thin metal suitable for hinge sockets, for example steel, with a sleeve-shaped socket element 5.1 and a protruding flange 5.2. The socket 5 is inserted into the opening 4 so that it bears with the flange 5.2 on the edge of the opening 4 of a surface of the component 1 facing away from the component 2 and is held with the socket-shaped section 5 in the opening 4. To secure the socket 5, the sleeve-shaped section 5.1 is bent on the end facing away from the flange-shaped section 5.2 on the edge of the opening 4 there provided with a bevel 4.1, so that the socket 5 forms an edge 5.3, which forms the lateral bearing and sliding surface for the component 2.

The hinge 3 consists furthermore of the hinge pin 6, which comprises a pin head 6.1 and an adjoining pin section 6.2 with a larger diameter and adjoining the latter a pin section 6.3 with a reduced diameter. The hinge pin 6 is held in the socket 5 with the pin section 6.2, so that the pin head 6.1 bears against the flange-shaped section 5.2. The hinge pin 6 engages with the section 6.3 in an opening 7 of the component 2 and is anchored there by riveting, for example using a wobble rivet process.

The components 1 are manufactured according to this embodiment in a follow-on or stage tool provided in a work apparatus, for example a press, in which the components 1 are produced in several processing steps, for example by punching and bending, during which also the opening 6 is made in the respective component 1. This follow-on or stage tool is also used for insertion of the sockets 5, bending of the respective socket 5.3, calibration of the sockets 5 using a suitable calibration tool or mandrel for ensuring an exact inner diameter of the sockets 5, insertion of the respective hinge pin 6 into a socket 5 inserted in a component 1 and securing of the hinge pin 6 in the respective socket 5, so that although hinge pin 6 is rotatably held in the respective socket 5, it is also secured against falling out of the socket 5.

Figure 3:
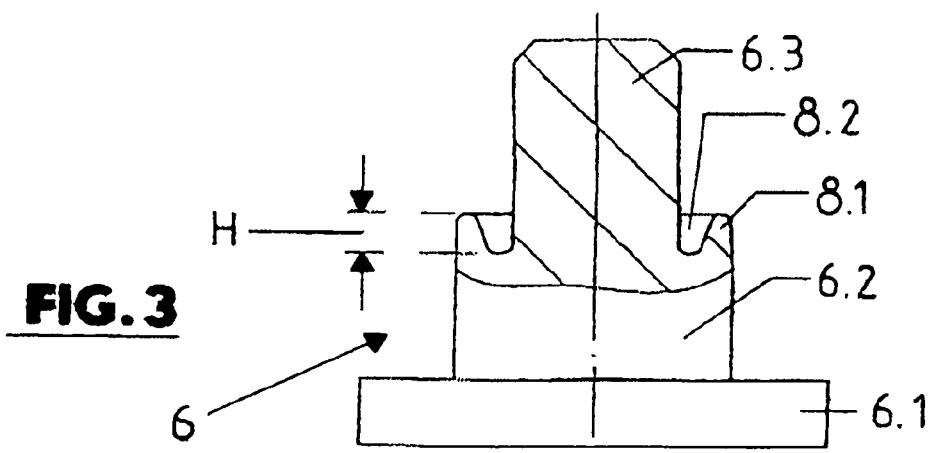
FIG. 3 shows a component drawing of the hinge pin.

FIG. 2 shows the state achieved following these process steps; the securing of the respective hinge pin 6 in this embodiment is achieved by a slight plastic deformation (clinching) of the material of the hinge pin in the area of the stage between the pin sections 6.2 and 6.3, so that the pin at this stage forms a ring-shaped section 8 protruding slightly over the circumference of the pin section 6.2, which (section 8) however is held in the expansion of the socket 5 formed by the bevel 4.1. In this embodiment the face or ring surface of the section 8 facing the pin section 6.3 lies in a plane with the surface of the socket edge 5.3 facing away from the component 1. To form the section 8 the hinge pin 6 is provided corresponding to FIG. 3, for example on the outer edge of the stage formed between the pin sections 6.2 and 6.3 with a ring-shaped protrusion 8.1. The ring-shaped protrusion 8.1 in this embodiment is formed by forming a ring-shaped groove 8.2, directly enclosing the pin section 6.3, into the ring surface forming the transition between the pin sections 6.2 and 6.3 and located in the plane perpendicular to the longitudinal pin axis.

Figure 4:
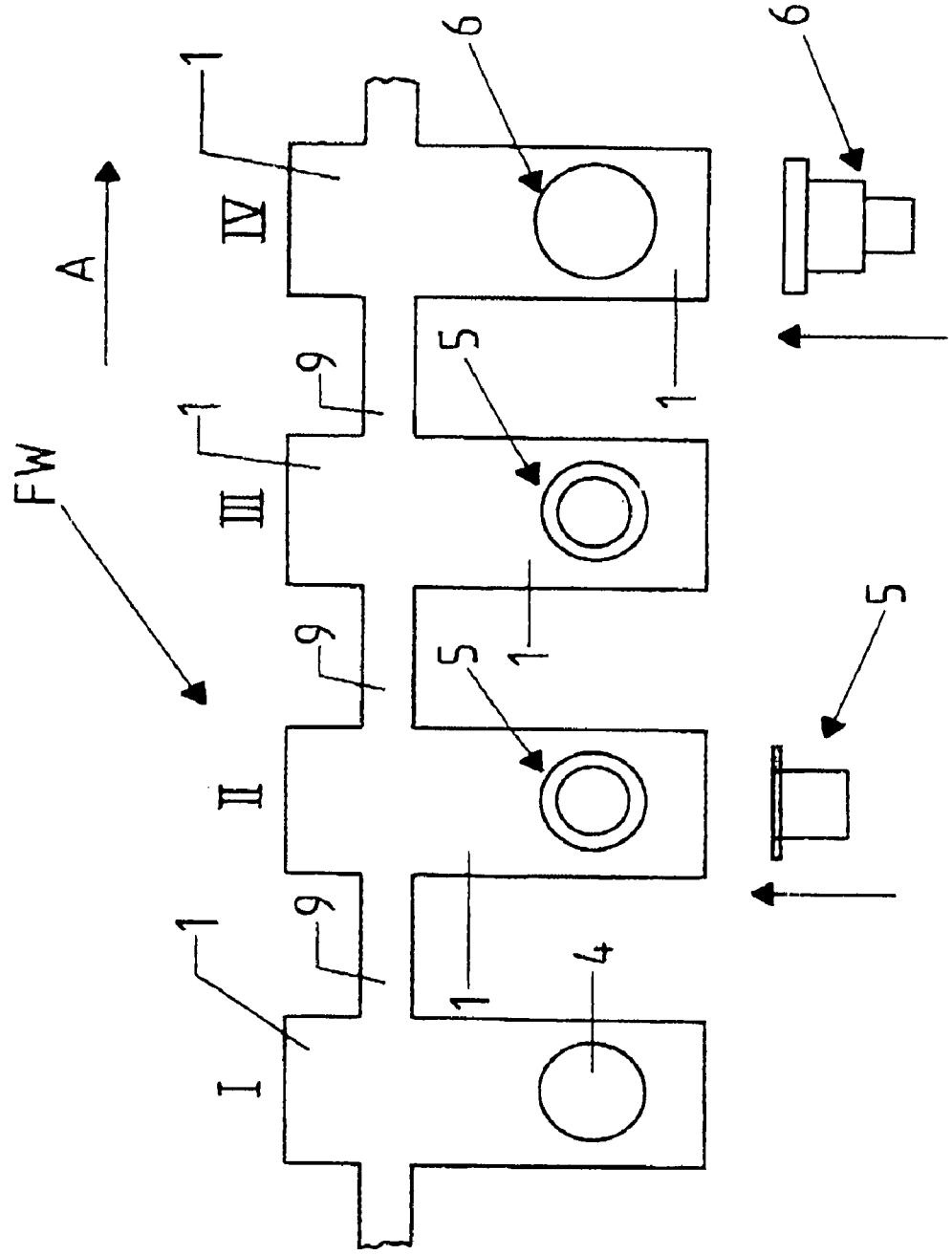
FIG. 4 shows a schematic representation of the processing steps in the manufacture of the hinge in FIG. 1 in a joining tool.

FIG. 4 again shows a schematic representation of the process described above, in which the individual components 1, which are manufactured for example from sheet steel by punching and bending, are moved in the direction of the arrow A in the cycle of the machine or press through the individual sections of the follow-on or stage tool. The manufacture of the components 1 and the pre-punching of said components with the holes 4 take place in the tool section I or in several tool sections. Insertion of the sockets into the respective opening 4 of a component 1 takes place in the tool section II. The bending of the edge 5.3 and the calibration of the respective socket 5 then take place in the tool section III. Finally, the joining and securing of the respective hinge pin 6 takes place in the tool section IV. During their movement through the follow-on or stage tool or through the individual tool sections, the components 1 are connected with each other by means of material links or material sections, as indicated schematically in FIG. 4 by 9. The components 1 are separated, for example by punching, only after completion of processing in the follow-on or stage tool, for example after joining and securing of the hinge pins 6, so that they can then be supplied for further utilization, namely for mounting of the components 2 to the pin sections 6.3. The latter takes place for example at a processing station outside of the press or at a production machine adjoining the press or the follow-on or stage tool outside of the press.

Figure 5:
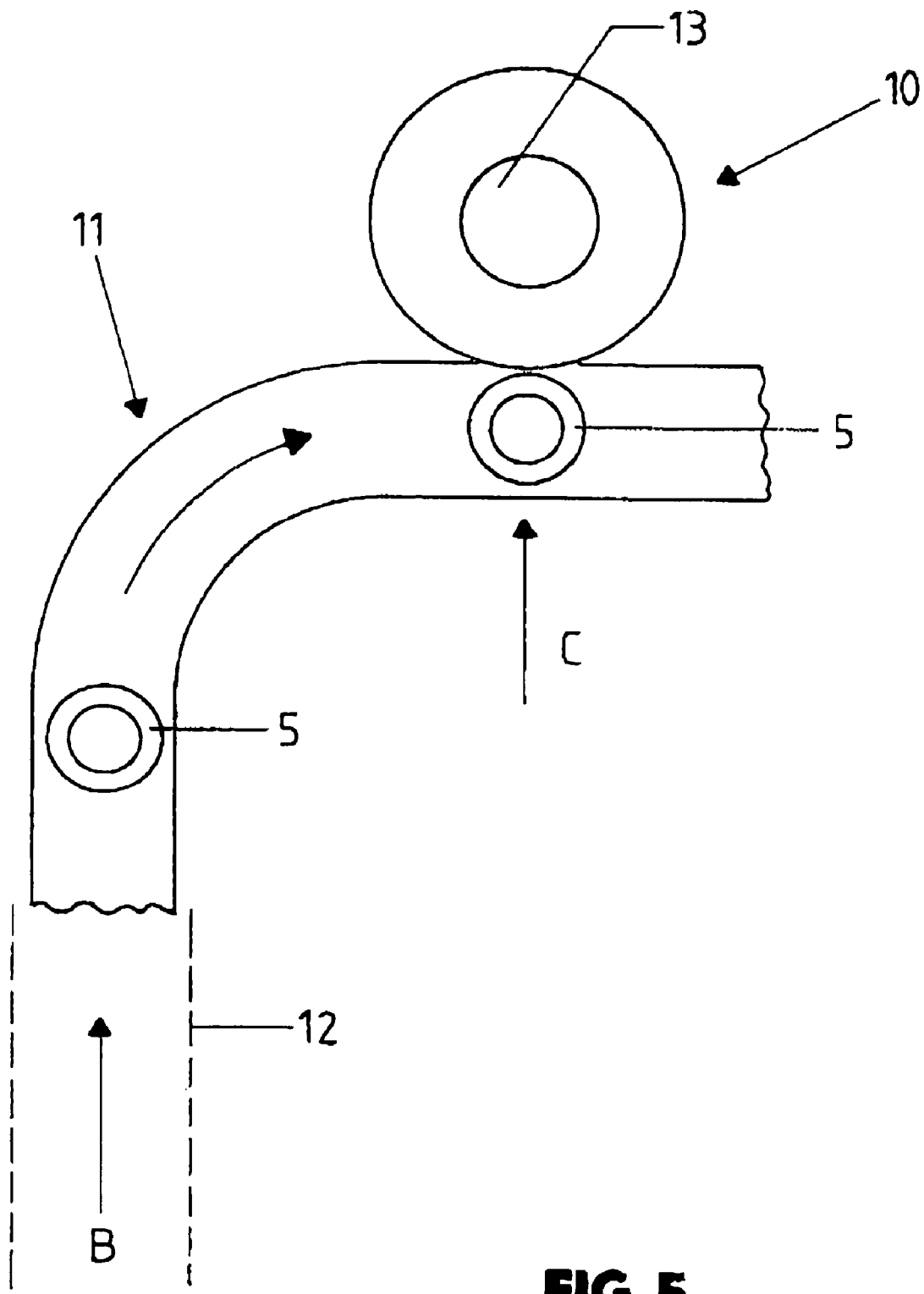
FIGS. 5 and 6 show various representations of a setting head for inserting or joining the hinge sockets.
Figure 6:
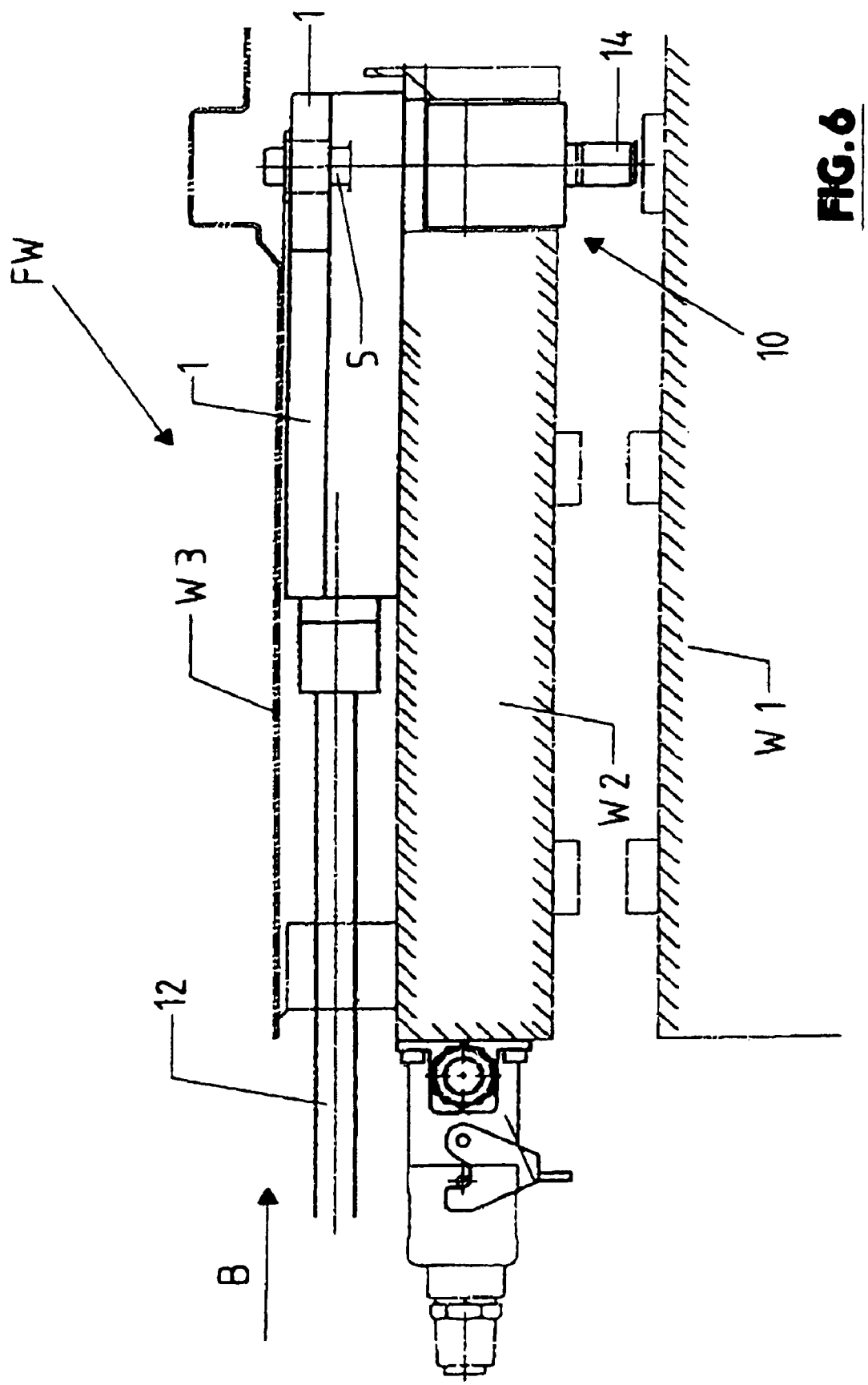

A socket setting head schematically indicated by 10 in FIGS. 5 and 6 is used to join the sockets 5. The sockets 5 are supplied from a supply unit located outside of the follow-on or stage tool or the press via a hose 12 with carrier air to the socket setting head 10, which is essentially known to persons skilled in the art as a "punching head", or to a rigid guide 11 of the socket setting head 10, corresponding to arrow B in the manner that the sockets 5 are arranged so that they are adjoining in the rigid guide 1 and oriented with their socket axes perpendicular to the direction of transport B. In each operating stroke of the tool, the socket 5 waiting at the front end in direction of transport B is moved out of the guide 11 into a ready position 13, as indicated by arrow C. The socket is then pushed axially from the ready position 13 with a die or plunger 14 controlled by the movement of the follow-on or stage tool or of the press into the opening 4 of the respective component 1.

FIG. 6 also depicts schematically the opposing tool parts W1, W2 and W3 of the follow-on tool FW and the socket setting head 10 provided at the tool part W2 with the plunger 14 that engages with the tool part W1 and the socket 5 inserted into the component 1.

As shown in FIG. 5, the rigid guide 11 has a bend of approximately 90°, namely in a plane that is perpendicular to the axis directions of the individual sockets and therefore also perpendicular to the joining direction. This design enables the optimum supply of the sockets 5 to the follow-on or stage tool in an axis direction crosswise or perpendicular to the direction of transport A.

Figure 7:
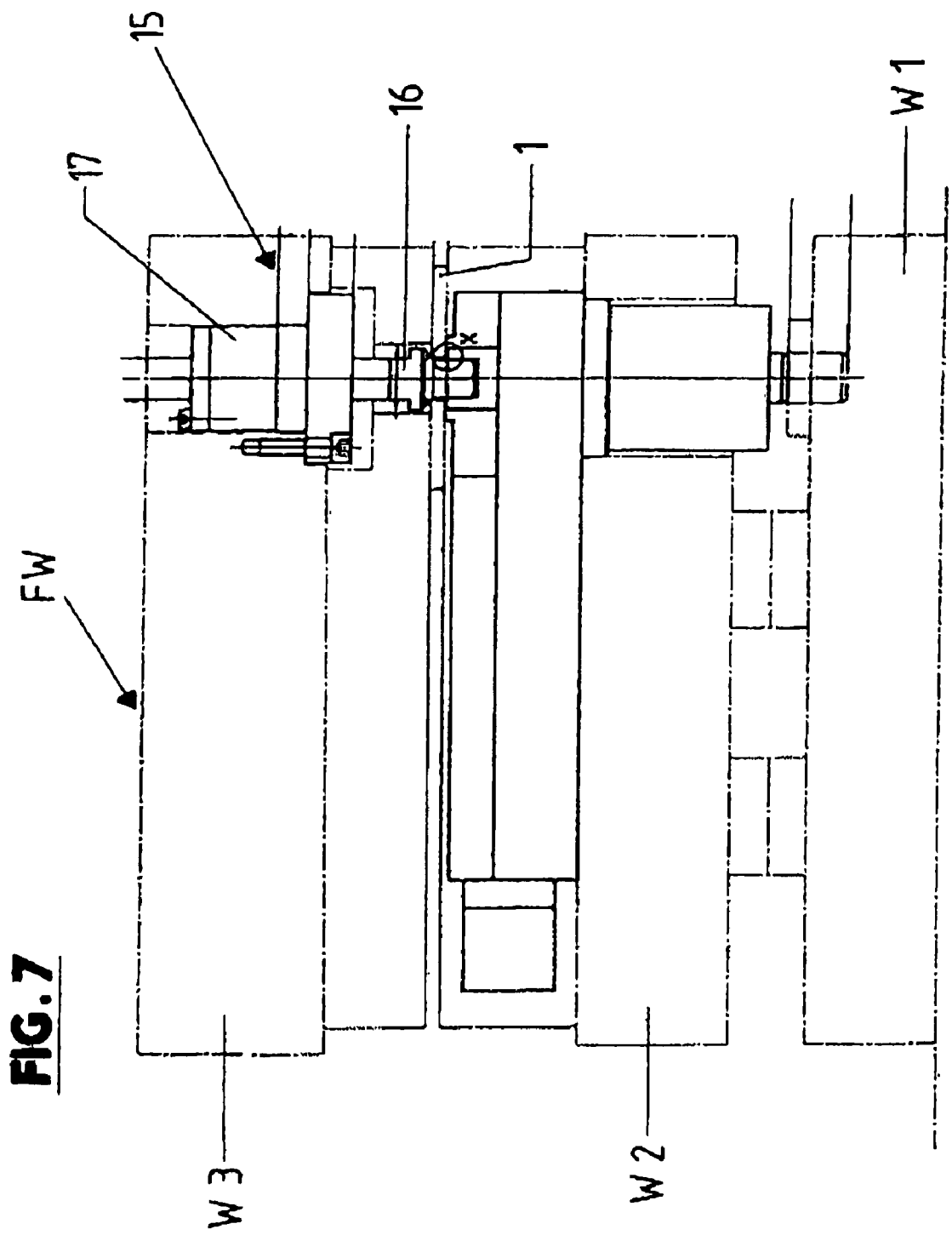
FIG. 7 shows a schematic representation of a calibration and bending tool.

The bending of the socket edge 5.3 and the calibration of the sockets takes place in the calibration and bending tool depicted schematically in FIG. 7, which likewise is provided in the follow-on tool FW or on one of the tool parts of the follow-on tool FW, and consists essentially of the calibration and bending ram 16 and an actuating element 17. While the joining of the respective socket 5 takes place for example from below, the calibration and bending of the socket edge with the ram 16 take place from above.

As explained above, the sockets 5 are designed with thin walls and therefore are subject to inadvertent deformation that can negatively affect the free movement of the hinge as a result of relatively slight force. Furthermore, considerable tolerances occur in the follow-on tool, e.g. with respect to the positioning of the components 1 at the tool sections, where the joining of the sockets 5 and the calibration and bending of the socket edge 5.3 take place, i.e. at the setting head 10 and at the calibration and bending tool 15. To prevent the exertion of force on the sockets and the possible deformation of the sockets as a result of inexact positioning of the respective component 1 during joining and also during calibration and bending of the edge 5.3, the movements of the corresponding tools, in particular of the plunger 14 and of the ram 16, are not purely path-controlled; instead, the respective tool adjusts to the actual position of the respective opening 4 or of the socket 5 inserted in said opening. This is achieved, for example, by the fact that the corresponding tools, especially perpendicular to the plane of the respective component 1, are spring-mounted and/or especially in the plane of the respective component 1 are floating mounted. This prevents deformation of the sockets 5 during insertion into the openings 4. Furthermore, the proper calibration and in particular also the even bending of the socket edge 5.3 and fastening of the respective socket 5 in the corresponding opening 4 are achieved in an optimal manner, so that when actuating the respective hinge 3 it is actually the hinge pin 6 that revolves in the socket 5 and not the socket 5 in the opening 4, which would be undesirable.

This floating mounting for the tool is achieved for example by a flexible connection between the end section of the plunger 14 engaging with the respective socket 5 and the end of the ram 16 with the remaining plunger 14 or ram 16 engaging with the respective socket 5. This part of the plunger 14 or ram 16 engaging directly with the respective socket 5 then has a short axial length, so that there is no tipping or tilting of the tool section engaging with the socket 5 and therefore no undesired deformation of the socket 5 during processing of the respective socket 5. Furthermore, the tool section engaging with the respective socket has a low weight or a low mass.

Figure 8:
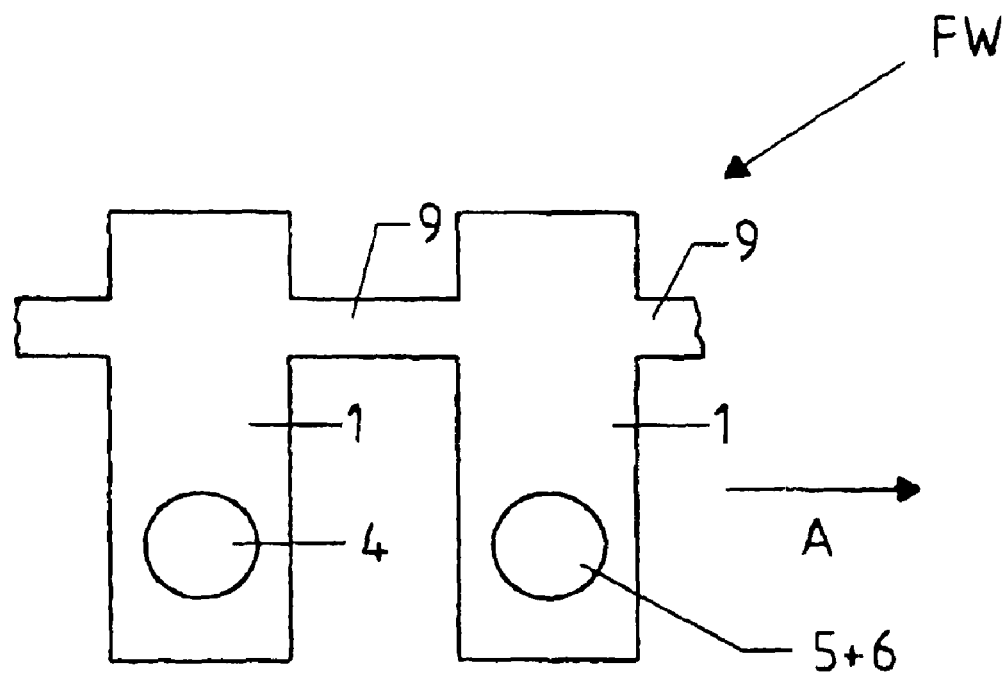
FIG. 8 shows a schematic representation of the sequence of functions for a further possible embodiment.
Figure 8:
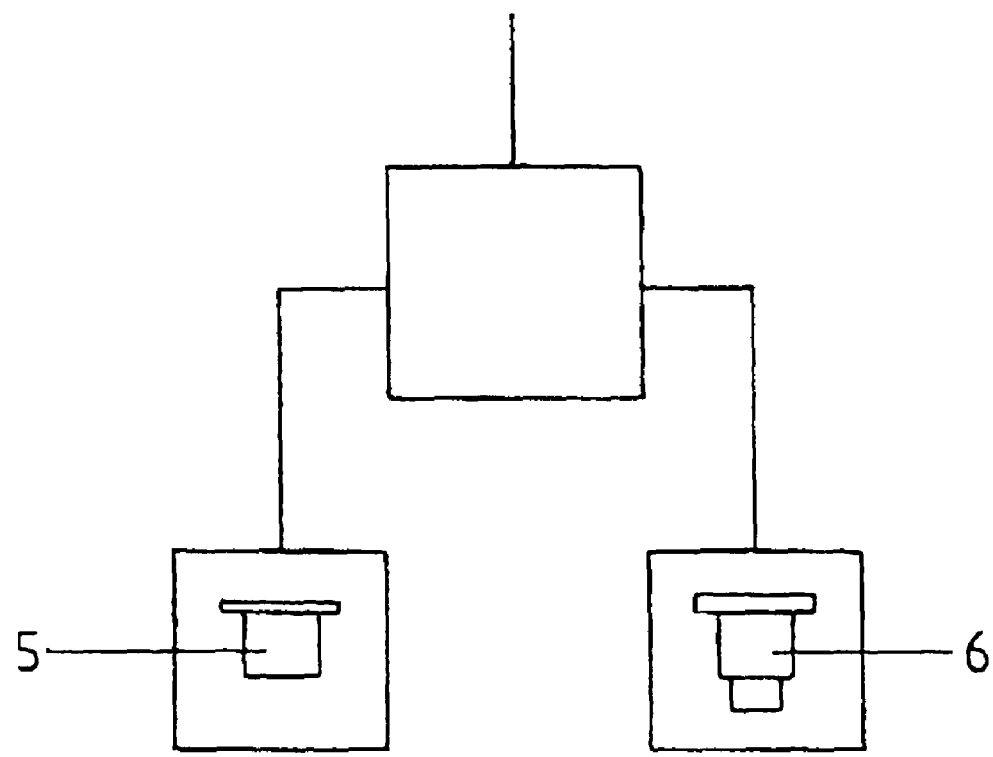

FIG. 8 shows a very schematic representation of the process for a further possible embodiment of the invention, in which the respective socket 5 is mounted in the respective component 1 with the corresponding hinge pin 6 pre-inserted. Corresponding to the depiction of FIG. 8, this takes place in the manner that the sockets 5 and the hinge pins 6 are supplied separately. During the process method, a socket 5 and a hinge pin 6 each are joined outside of the follow-on or stage tool and then supplied in this form to the corresponding setting head for insertion of the socket/hinge pin combination into the opening 4 of the respective component 1. The bending of the socket edge 5.3 and the securing of the hinge pin 6 by clinching or another suitable method take place for example in the same tool section of the follow-on tool FW.

Figure 9:
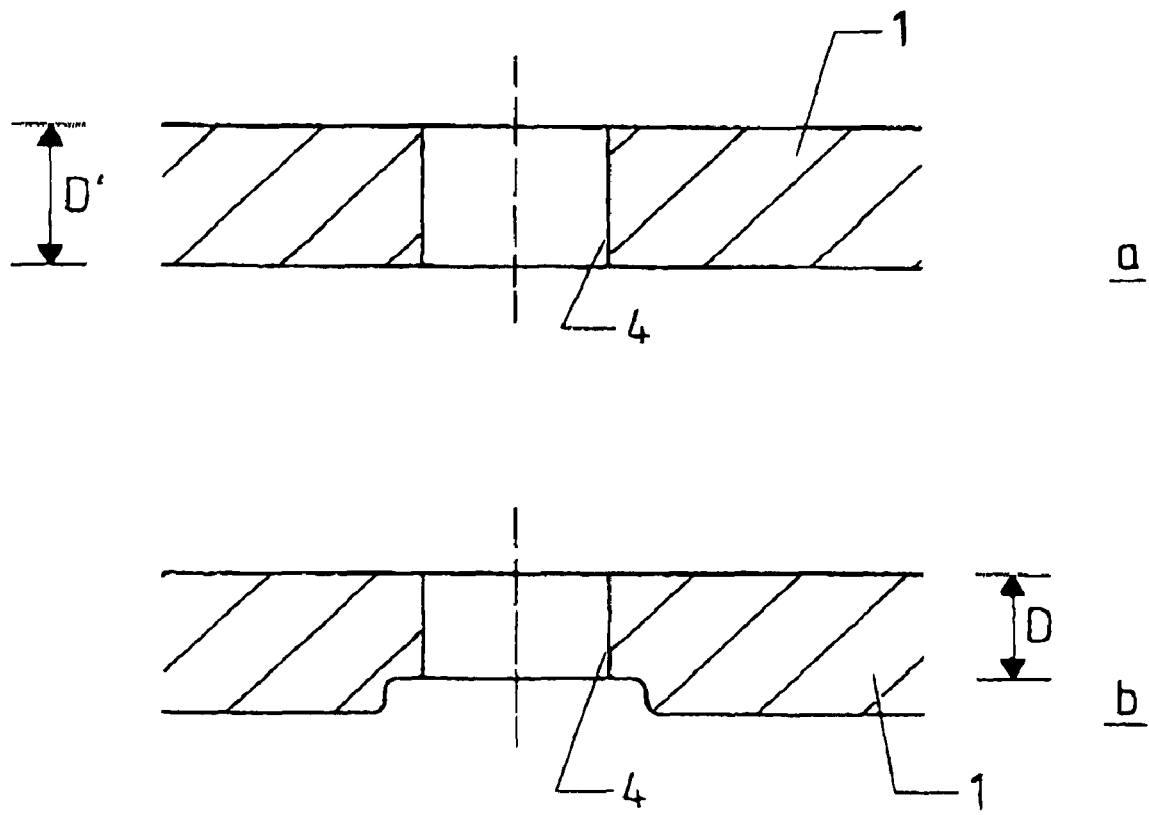
FIG. 9 shows a schematic representation in cross section of a component in the area of the bearing or hinge socket before calibration of the sheet or component thickness and after calibration of the component or sheet thickness.

FIG. 9 shows a simplified depiction in cross section of the component 1 in the area of the opening 4, namely in position a after punching of the component 1 and after insertion of the openings 4. In this embodiment of the method according to the invention, the thickness of the component 1 is first calibrated by a punch-like tool before insertion of the socket 5, so that after calibration the component 1 has the required thickness at least in the area of the opening 4 or of the hinge 3. In this method, the component 1 is therefore first manufactured with the somewhat greater thickness D', which is then reduced or calibrated to the thickness D in the area of the opening 4 during calibration. This calibration takes place for example in a further processing step at an additional position between the positions I and II of FIG. 4. With a corresponding tool design, however, this calibration can also take place in position 1 during manufacture of the component 1 or in position II before insertion of the respective socket 5.

Figure 10:
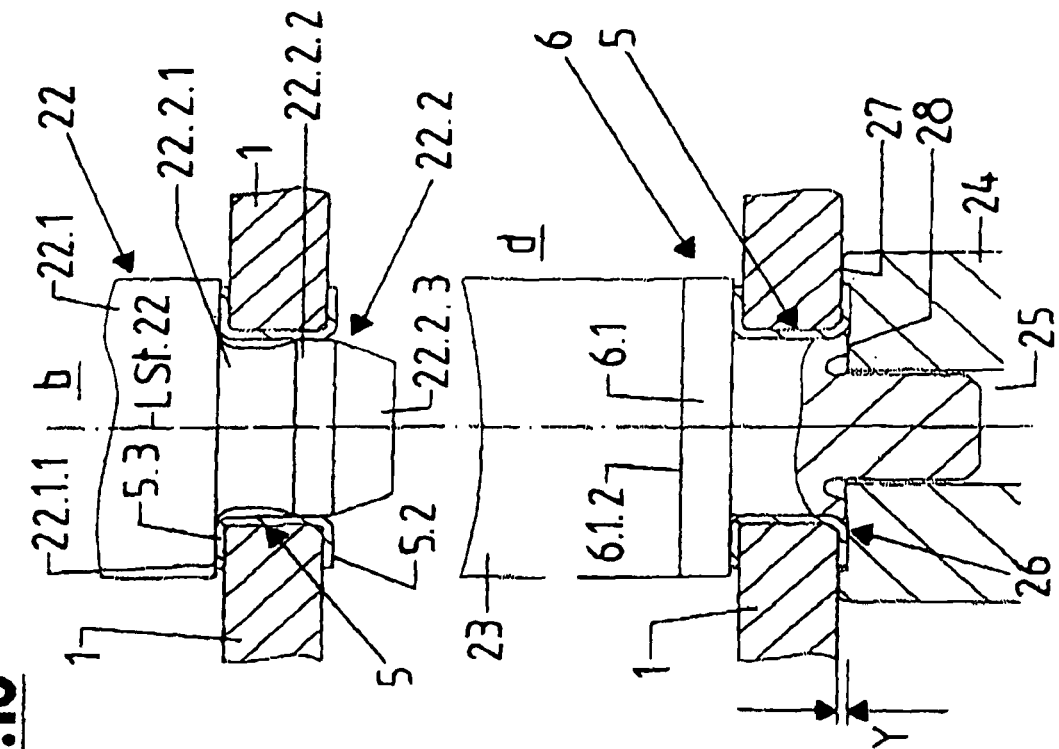
FIG. 10 shows in positions a)-d) again in detail the various processing steps for calibrating and fastening the bearing or hinge socket and for inserting and securing the hinge pin.
Figure 10:
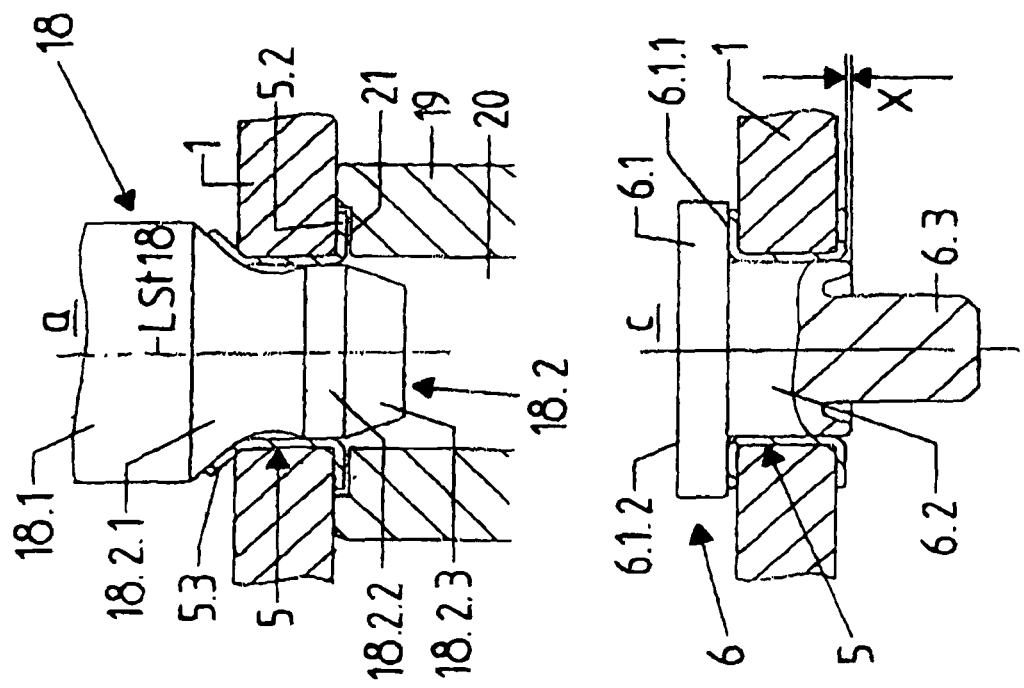

FIG. 10 shows in detail the processing steps already described in general in FIG. 2 for inserting the bearing or hinge socket 5 into the component 1, for calibration and fastening of the socket and for inserting and securing the hinge pin 6 in the socket. Position a) shows the component 1 together with the hinge socket 5 already inserted into said component or the opening 4 and with a calibration and bending ram 18, of which the two sections 18.1 and 18.2 are shown and which is inserted with the section 18.2 into the socket 5 for the calibration of the latter, namely from the side of the socket comprising the socket edge 5.3 to be bent. The component 1 and the hinge socket 5 are supported on the flange-shaped socket section 5.2 with an opposing tool 19. The matrix-shaped opposing tool 19 forms an opening 20 for holding the section 18.2. The opening 20 features on its opening edge facing the component 1 an expansion 21, namely for holding the socket section 5.2. The calibration and bending ram 18 also achieves initially partial bending of the socket edge 5.3. For this purpose, the calibration and bending ram 18 is provided with a conical tapered sub-section 18.2.1, on which toward the free end of the calibration and bending ram 18 first a circumferentially reduced sub-section 18.2.2 adjoins, followed by the sub-section 18.2.3 with a cylindrical outer surface serving to calibrate the inner diameter of the bearing or hinge socket 5 and, adjoining the latter, the truncated tapered sub-section 18.2.4 forming the free end of the calibration and bending ram 18. All sub-sections are designed so that they are rotationally symmetrical on their peripheral surface and on the same axis with the longitudinal axis $L_{St18}$ of the calibration and bending ram 18.

The complete bending of the socket edge 5.3 takes place corresponding to position b) of FIG. 10 with a bending ram 22, which comprises a ram section 22.1 with an enlarged outer diameter and a section 22.2 with a reduced outer diameter forming the ram end, which (reduced section) is shaped similarly to the section 18.2, namely starting from the ram section 22.1 toward the free end of the bending ram 22 with a constricted or tapered sub-section 22.2.1, with a sub-section 22.2.2 comprising a cylindrical outer surface and with a truncated tapered sub-section 22.2.3 forming the free end of the bending ram 22. Between the section 22.1 and the section 22.2 there is a ring-shaped surface 23, which lies in a plane parallel to the longitudinal axis $L_{St22}$ of the ram and with which the socket edge 5.3 is fully bent during insertion of the ram section 22.2 into the bearing or hinge socket 5.

In this processing step the component 1 and the bearing or hinge socket 5 are again supported on the opposing tool 19. In a further processing step corresponding to position c) of FIG. 10, the hinge pin 6 is inserted into the bearing or hinge socket 5 secured in the component 1, so that its pin section 6.2 is held in the socket 5. The hinge pin 6 is provided with the ring-shaped protrusion 8.1 described in connection with FIG. 3. The axial distance between the free edge of the protrusion 8.1 and the plane of the side 6.1.1 of the pin head facing the pin sections 6.2 and 6.3, taking into account the component tolerances, i.e. in particular taking into account the tolerances of the thickness of the component 1, the thickness or material thickness of the bearing or hinge socket 5 and the axial length of the pin section 6.2 with the protrusion 8.1, is selected so that said protrusion protrudes slightly with its free edge over the plane of the side of the socket section 5.2 facing away from the component 1 after insertion of the hinge pin 6, as indicated by the dimension X in position c).

The securing of the hinge socket 6 in the bearing or hinge socket 5 takes place through clinching or by partial plastic deformation of the protrusion 8.1 in the manner depicted in position d) of FIG. 10. For this purpose, a tool is used that consists of the die 23, which bears against the pin head 6.1 or against the top side 6.1.2 facing away from the pin sections 6.2 and 6.3, and of the matrix-shaped opposing tool 24. The opposing tool 24 forms an opening 25 for holding the pin section 6.3. The opening 25 is provided with an expansion 26 on the side facing the component 1, i.e. on the bearing or support surface 27 of the opposing tool 24, in the manner that the socket section 5.2 is held in this expansion so that during clinching of the protrusion 8.1 no or essentially no force is exerted on this socket section, but that the desired clinching or plastic deformation of the protrusion 8.1 is achieved. For this purpose, the expansion 26 is provided on its bottom with a ring-shaped raised area 28 that encloses the opening 25 and in the depicted embodiment is somewhat recessed in relation to the plane of the bearing surface 27, i.e. does not protrude over the plane of the bearing surface 27, but instead is at a distance from said plane by the dimension designated Y in FIG. 10, position d) and FIG. 11, position a). The protrusion 8.1 is clinched using the tool consisting of the ram 23 and the opposing tool 24 so that the ring-shaped securing section 8 is at a distance in relation to the plane of the bottom side of the socket section 5.2 facing away from the component 1, i.e. is displaced in relation to this plane toward the pin head 6.1. This is again made possible by the fact that the opening 4 is provided with the chamfered area or bevel 4.1.

Figure 11:
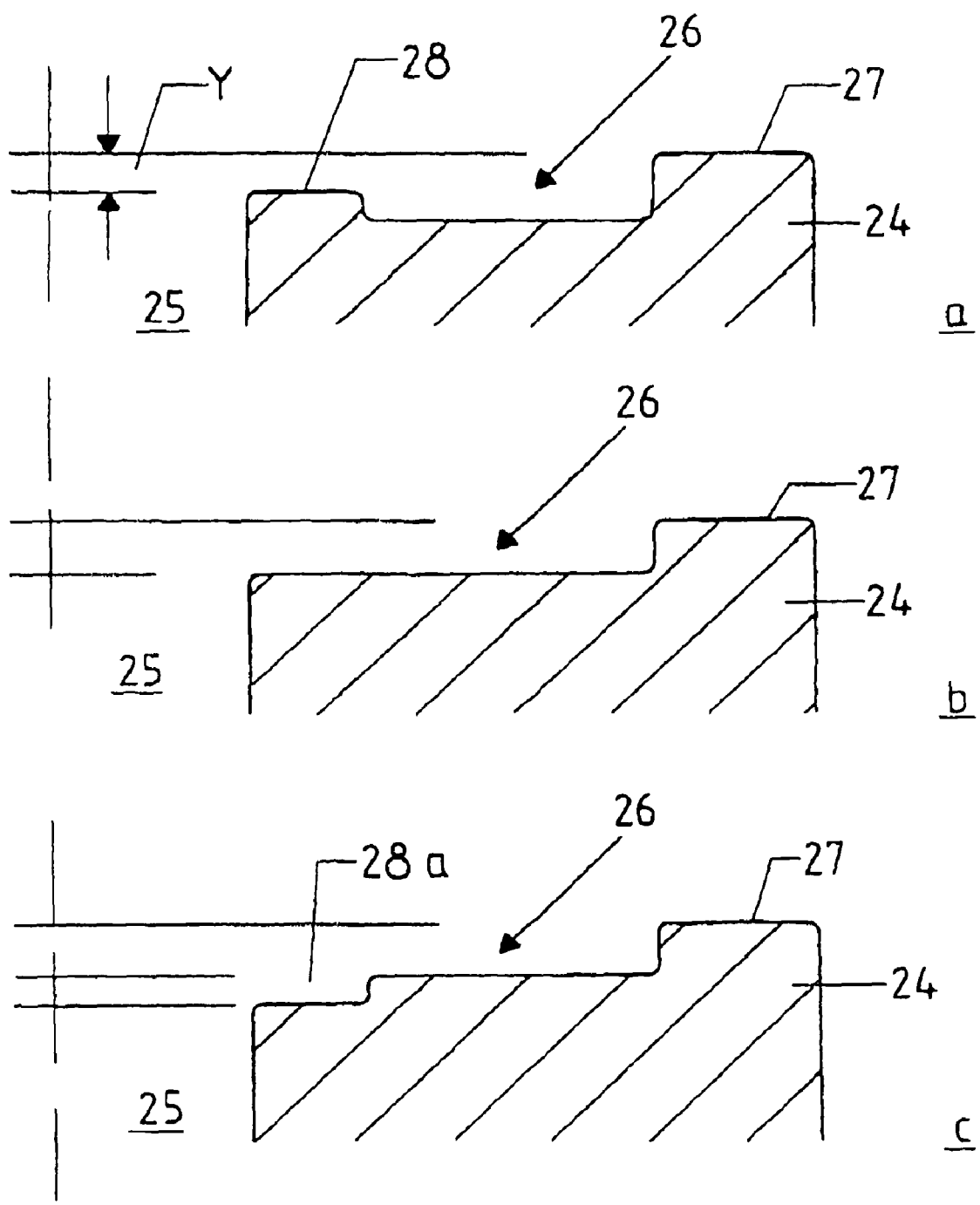
FIG. 11 shows a simplified representation in positions a)-c) of various profiles for an opposing tool.

As shown in FIG. 11, a corresponding design of the opposing tool 24 in the area of the expansion 26 enclosing the opening 25 enables the clinching to be performed in the manner that the surface of the ring-shaped securing section 8 facing away from the pin head 6.1 lies in a common plane with the bottom side of the socket section 5.2 facing away from the component 1, for which purpose the opposing tool does not have the ring-shaped protrusion in the area of the expansion 26 (FIG. 11, position b)), or protrudes over this plane, for which purpose the opposing tool 24 has a ring-shaped recess 28a enclosing the opening 25 instead of the protrusion 28 in the area of the expansion 26 (FIG. 11, position c)).

In any case, the axial length of the pin section 6.2 enclosing the protrusion 8.1 is selected so that it is at least equal to the sum of the material thickness of the component 1, double the material thickness of the bearing or hinge socket 5 plus the tolerances of the component 1 and double the wall thickness of the bearing or hinge socket 5.

Since the clinching should take place only in the area of the protrusion 8.1, it is sufficient for securing of the hinge pin 6 if the height H or the axial dimension of the protrusion 8.1 is at least equal to the sum of the tolerances of the thickness of the component 1 and double the tolerance of the wall thickness of the bearing or hinge socket 5; in such cases, in which the securing section 8 produced by clinching is recessed, i.e. set back from the plane of the side of the socket section 5.2 facing away from the component 1 and cannot be reduced past this recessed dimension, while in the event that the securing section 8 produced by clinching protrudes over the socket section 5.2, the height H of the protrusion 8.1 is enlarged by the protruding dimension.

Furthermore, the protrusion 8.1 is in any case designed so that the volume of the overhang X (position c) of FIG. 10) is not greater or not essentially greater than the free space available for the clinching of the protrusion 8.1, i.e. is essentially formed by the bevel 4.1.

As shown particularly by a comparison of the positions c) and d), the clinching of the protrusion 8.1 takes place in any case in the manner that the protrusion is not deformed over its entire height H, but only on a very small part of its height, for example a maximum of 20% of its height H in the area of the free edge.

Figure 12:
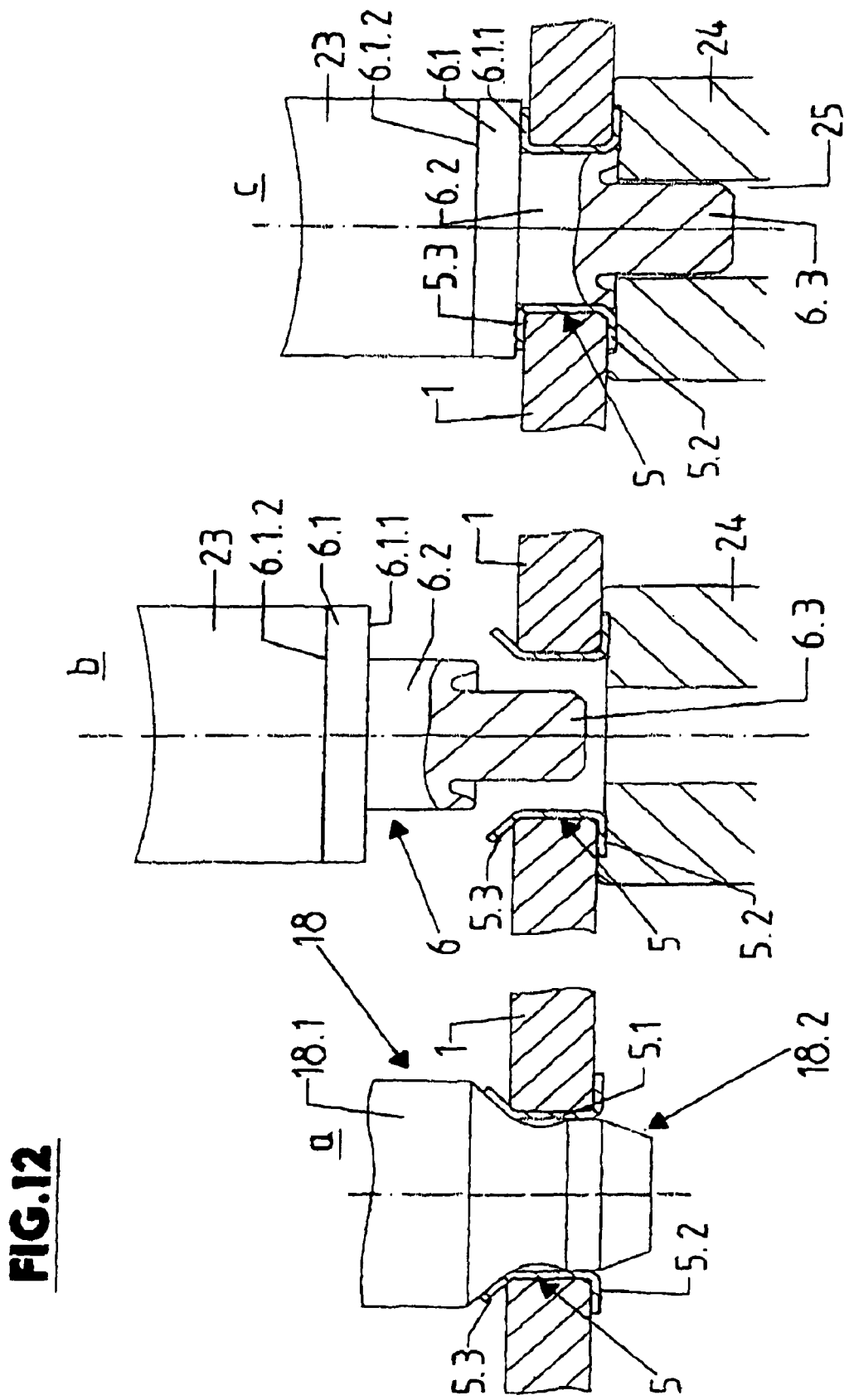
FIG. 12 shows a representation similar to FIG. 10, however for a further embodiment of the method according to the invention.

FIG. 12 shows in positions a) and b) a simplified process, as compared with FIG. 10, for fastening of the bearing or hinge socket and for setting and securing the hinge pin 6. Position a) of FIG. 12 corresponds to position a) of FIG. 10, i.e. this position again depicts the calibration of the bearing and hinge socket 5 and the partial bending of the socket edge 5.3 with the calibration and bending ram 18.

Position b) depicts the tool consisting of the ram 23 and the opposing tool 24 together with the component 1, the bearing or hinge socket 5 temporarily fastened in said component and the hinge pin 6. The bending of the socket edge 5.3 is achieved in this method not by means of a special tool, i.e. not by the bending ram 22, but instead by the hinge pin 6 held on the die 23 in a suitable manner, for example by permanent magnets, vacuum, etc. and which (hinge pin) upon insertion of its pin section 23 into the opening 25 of the opposing tool 24 and upon subsequent clinching of the protrusion 8.1 with the pin head 6.1 or with the pin head side 6.1.1 also causes the complete bending of the socket edge 5.3, so that the state depicted in position c) of FIG. 11 is again achieved.

The insertion and fastening of the bearing or hinge socket 5 and the setting and securing of the hinge pin 6 are achieved in this embodiment likewise under or in the press and also in a production tool, for example a follow-on or stage tool, which also is used for the manufacture of at least the component 1, for example by punching and bending. As described above, at least the tools used for inserting, calibration and fastening of the bearing and hinge sockets 5 are again moveably mounted, i.e. in particular floating or spring mounted, resulting in a power-controlled movement of these tools instead of the path-controlled movement of the press.

The methods described in connection with FIGS. 10-12 can be combined in a preferable embodiment with the method described in FIG. 9 for calibration of the material thickness of the component 1, i.e. the component thickness is calibrated before setting of the respective bearing or hinge socket, so that in particular during clinching of the hinge pins, there is no deformation of the material thickness of the socket edge 5.3 due to tolerances, even with the use of non-spring mounted clinching tools (die 23 and opposing tool 24).

It was assumed above that the hinge pins 6 have a ring-shaped protrusion 8.1 in order to secure them. Of course, it is also possible to provide instead of a ring-shaped protrusion a protrusion with another shape, or several protrusions distributed around the axis of the hinge pin 6.

The invention was described above based on exemplary embodiments. It goes without saying that numerous modifications and variations are possible without abandoning the inventive idea upon which the invention is based.

REFERENCE LIST 1, 2 component or workpiece
3 hinge
4 opening
4.1 bevel
5 bearing or hinge socket
5.1 sleeve-shaped socket section
5.2 flange-shaped socket section
5.3 bent socket edge
6 hinge pin
6.1 head
6.1.1, 6.1.2 head side
6.2, 6.3 pin section
7 opening in component or workpiece 2
8 securing section produced by clinching
8.1 protrusion
8.2 groove
9 material link between the components 1
10 socket setting head
11 rigid guide
12 supply hose
13 ready position
14 plunger
15 calibration and bending tool
16 calibration and clinching ram 17 actuating element, for example pneumatically or hydraulically controlled
18 calibration and bending ram
18.1, 18.2 ram section
18.2.1-18.2.3 sub-section
19 opposing tool
20 opening of the opposing tool 19
21 expansion of the opening 20
22 bending ram
22.1, 22.2 ram section
22.2.1-22.2.3 sub-section
23 die
24 opposing tool
25 opening of the opposing tool 24
26 expansion of the opening 25
27 contact surface for component 1
28 ring-shaped raised area for clinching of the protrusion 8.1
28a ring-shaped depression
A direction of movement of components 1 in follow-on tool
B direction of transport of sockets 5 to the socket setting head
C movement of each socket 5 from the rigid guide 11 into the ready position 13
$L_{St18}$, $L_{St22}$ longitudinal ram axis
X, Y dimension or overhang
FW follow-on tool
W1, W2, W3 tool element of follow-on tool
D calibrated component thickness
D' non-calibrated component thickness

What is claimed is:

1. A method for manufacturing a hinge connection, the method comprising:
   inserting a hinge socket and a hinge pin positioned within the hinge socket into at least one opening of a first component, the hinge pin including a first pin section and a second pin section extending from the first pin section, wherein the second pin section of the hinge pin protrudes from the hinge socket for fastening of a second component on the second pin section; and
   manufacturing the first component in a follow-on tool or in a stage tool by bending or punching;
   wherein insertion of the hinge socket and the hinge pin in the at least one opening of the first component takes place in the follow-on tool or the stage tool during the step of manufacturing the first component.

2. The method according to claim 1, wherein the step of manufacturing the first component employs a press and the step of inserting the hinge socket and the hinge pin in the at least one opening takes place in the press during manufacture of the first component.

3. The method according to claim 1, wherein the hinge socket is inserted using a floating mounted tool or a spring mounted tool.

4. The method according to claim 1, wherein a calibration or at least a partial fastening of the hinge socket takes place by bending a socket edge using a floating mounted or spring mounted tool.

5. The method according to claim 1, wherein the hinge socket is fastened by bending a socket edge of the hinge socket in at least two steps, namely by a first step of partial bending so that the socket edge protrudes at least with a free edge area from the first component and by a second step of subsequent complete bending so that the socket edge bears against the first component.

6. The method according to claim 5, wherein the first step of partial bending is made by a calibration and bending tool.

7. The method according to claim 5, wherein the second step of subsequent complete bending is made by a bending tool or by the hinge pin when setting or inserting said hinge pin into the hinge socket.

8. The method according to claim 1, wherein after insertion into the hinge socket, the hinge pin is secured to the hinge socket and in the at least one opening of the first component.

9. The method according to claim 8, wherein the hinge pin is secured by plastic deformation or by clinching of the hinge pin or a section of the hinge pin.

10. The method according to claim 8, wherein the hinge pin is secured by plastic deformation of at least one protrusion of the hinge pin.

11. The method according to claim 1, wherein the first component is calibrated to a required component thickness (D) at least in an area of the at least one opening through permanent or plastic deformation of the first component.

12. The method according to claim 11, wherein the first component is initially manufactured with a component thickness (D') that is greater than a thickness of the first component in an area of the hinge connection, and that the thickness of the first component is calibrated before insertion of the hinge socket.

13. The method according to claim 1, wherein the hinge pin is secured by plastic deformation of at least one protrusion of the hinge pin.

14. The method according to claim 1, wherein the first pin section adjoins a pin head having a larger diameter and the second pin section has a reduced diameter, the first pin section being held in the hinge socket, and the hinge pin is secured by deforming or clinching in the area of a transition between the first pin section and the second pin section.

15. The method according to claim 14, wherein the hinge pin is secured by deforming a ring-shaped protrusion in the area of the transition between the first pin section and the second pin section.

16. The method according to claim 14, wherein the deforming or clinching of the hinge pin is performed in a manner that at least one section protruding radially over a circumference of the hinge pin forms a section enclosing a pin axis in a ring-shaped manner.

17. The method according to claim 16, wherein the hinge pin is secured by clinching of the hinge pin in a manner that the at least one section protruding radially over the circumference of the hinge pin is held in a free space formed by an expansion or bevel of the opening of the first component.

18. The method according to claim 16, wherein the hinge pin is secured by clinching of the hinge pin in a manner that the at least one section protruding radially over the circumference of the hinge pin and securing the hinge pin is located within the hinge socket, or lies in a common plane with an opening edge of the hinge socket or protrudes outward over the hinge socket.

19. The method according to claim 14, further comprising a ring-shaped protrusion formed by a groove or recess in a ring surface forming the transition between the first pin section and the second pin section.

20. The method according to claim 14, wherein the hinge pin is secured by clinching of at least one protrusion in a manner that the latter is deformed only in the area of its free end over a maximum of 20% of its height (H).

21. The method according to claim 14, wherein the clinching of the hinge pin is power-controlled, using at least one spring mounted tool.

22. A method for manufacturing a hinge connection, comprising:

inserting a hinge socket and a hinge pin, having a first pin section and a second pin section, in at least one opening of a first component so that the second pin section of the hinge pin protrudes from the hinge socket for fastening of a second component on the second pin section; and manufacturing the first component in a production tool;

wherein the step of inserting the hinge socket and the hinge pin in the at least one opening of the first component takes place in the production tool used for the manufacture of the first component; and further including the step of securing the hinge pin into the hinge socket or in the first component, wherein the hinge pin comprises adjoining to a pin head a first pin section extending from the pin head, the first pin section having a larger diameter, and adjoining to the first pin section at least one second pin section having a reduced diameter smaller than that of the first pin section, the first pin section is held in the respective hinge socket, and wherein the step of securing the hinge pin includes deforming or clinching in an area of a transition between the first pin section and the second pin section.

23. The method according to claim 22, wherein the securing of the hinge pin takes place by deforming of a ring-shaped protrusion in the area of the transition between the first pin section and the second pin section.

24. The method according to claim 22, wherein the clinching of the hinge pin takes place in a manner that at least one section protruding radially over a circumference of the hinge pin forms a section enclosing a pin axis in a ring-shaped manner.

25. The method according to claim 22, wherein the clinching of the hinge pin takes place in a manner that at least one section protruding radially over a circumference of the hinge pin is held in a free space formed by an expansion or bevel of the at least one opening of the first component.

26. The method according to claim 22, wherein the clinching of the hinge pin takes place in a manner that at least one section protruding radially over a circumference of the hinge pin and securing said hinge pin is located within the hinge socket, or lies in a common plane with an opening edge of the hinge socket or protrudes outward over the hinge socket.

27. The method according to claim 22, wherein a ring-shaped protrusion is formed by a groove or recess in a ring surface forming a transition between the first pin section and the second pin section.

28. The method according claim 22, wherein clinching of at least one protrusion takes place in a manner that the at least one protrusion is deformed only in the area of its free end over a maximum of 20% of its height (H).

29. The method according to claim 22, wherein clinching of the hinge pin is power-controlled, using at least one spring mounted tool.

30. A method for manufacturing a hinge or a hinge connection, comprising:

providing a hinge socket with a hinge pin in at least one opening of a first component with a pin end of the hinge pin protruding from the hinge socket for fastening of a second component on the pin end; and securing the hinge pin in the hinge socket or in the first component;

wherein the hinge pin comprises adjoining to a pin head a first pin section with a larger diameter and adjoining to the first pin section a second pin section with a reduced diameter, the first pin section being held in the respective hinge socket, and the step of securing of the hinge pin takes place by deforming or clinching in the area of a transition between the first pin section and the second pin section.

31. The method according to claim 30, wherein the securing of the hinge pin takes place by deforming of a ring-shaped protrusion, in the area of the transition between the first and the second pin section.

32. The method according to claim 30, wherein the clinching of the hinge pin takes place in a manner that at least one section protruding radially over a circumference of the hinge pin forms a section enclosing a pin axis in a ring-shaped manner.

33. The method according to claim 32, wherein the clinching of the hinge pin takes place in a manner that the section protruding radially over the circumference of the hinge pin is held in a free space formed by an expansion or bevel of the opening.

34. The method according to claim 32, wherein the clinching of the hinge pin takes place in a manner that the section protruding radially over the circumference of the hinge pin and securing said hinge pin is located within the hinge socket, or lies in a common plane with an opening edge of the hinge socket or protrudes outward over the hinge socket.

35. The method according to claim 32, wherein the ring-shaped protrusion is formed by a groove or recess in a ring surface forming the transition between the first pin section and the second pin section.

36. The method according to claim 32, wherein the clinching of the at least one protrusion takes place in a manner that the latter is deformed only in the area of its free end over part of its height, over a maximum of 20% of its height (H).

\* \* \* \* \*